US008773299B1

(12) United States Patent
Woodell et al.

(10) Patent No.: US 8,773,299 B1
(45) Date of Patent: Jul. 8, 2014

(54) SYSTEM AND METHOD FOR ACTIVELY DETERMINING OBSTACLES

(75) Inventors: Daniel L. Woodell, Cedar Rapids, IA (US); Richard D. Jinkins, Rewey, WI (US); Richard M. Rademaker, Rijswijk ZH (NL)

(73) Assignee: Rockwell Collins, Inc., Cedar Rapids, IA (US)

( * ) Notice: Subject to any disclaimer, the term of this patent is extended or adjusted under 35 U.S.C. 154(b) by 579 days.

(21) Appl. No.: 12/569,805

(22) Filed: Sep. 29, 2009

(51) Int. Cl.
| | |
|---|---|
| *G01S 13/93* | (2006.01) |
| *G08G 5/04* | (2006.01) |
| *G01S 13/00* | (2006.01) |
| *G01S 13/95* | (2006.01) |
| *G08G 5/00* | (2006.01) |

(52) U.S. Cl.
USPC .............. 342/29; 701/1; 701/3; 701/4; 701/8; 701/9; 701/14; 701/17; 701/300; 701/301; 340/945; 340/961; 340/963; 340/970; 342/26 R; 342/26 B; 342/27; 342/61; 342/63; 342/65; 342/118; 342/123; 342/175; 342/195

(58) Field of Classification Search
USPC ................ 342/27, 28, 29, 26 R–26 D, 52–56, 342/61–65, 118–123, 175, 192–197; 701/1, 701/3, 14, 300, 301, 2, 4, 8, 9, 17; 356/3, 356/4.01, 5.01, 5.03, 5.05, 5.08, 5.1, 5.15; 250/330, 332; 324/500, 501; 340/945, 340/983, 961, 963, 970; 73/12.01, 12.09; 180/167–169
See application file for complete search history.

(56) References Cited

U.S. PATENT DOCUMENTS

| | | | | |
|---|---|---|---|---|
| 3,713,147 A | * | 1/1973 | Chanzit et al. | 342/65 |
| 4,030,065 A | * | 6/1977 | Bateman | 340/970 |
| 4,068,124 A | * | 1/1978 | Kleider | 250/332 |
| 4,069,888 A | * | 1/1978 | Wolters et al. | 180/169 |
| 4,224,669 A | * | 9/1980 | Brame | 342/65 |
| 4,520,445 A | * | 5/1985 | Keearns | 342/65 |
| 4,572,662 A | * | 2/1986 | Silverman | 356/5.15 |
| 4,602,336 A | * | 7/1986 | Brown | 342/64 |
| 4,646,244 A | * | 2/1987 | Bateman et al. | 701/301 |
| 4,675,823 A | * | 6/1987 | Noland | 701/300 |
| 4,700,307 A | * | 10/1987 | Mons et al. | 342/64 |
| 4,737,788 A | * | 4/1988 | Kennedy | 342/29 |
| 4,782,450 A | * | 11/1988 | Flax | 701/301 |
| 4,818,990 A | * | 4/1989 | Fernandes | 701/2 |
| 4,839,658 A | * | 6/1989 | Kathol et al. | 342/29 |
| 4,902,126 A | * | 2/1990 | Koechner | 356/5.08 |
| 5,006,988 A | * | 4/1991 | Borenstein et al. | 180/169 |
| 5,157,334 A | * | 10/1992 | Lowther | 324/501 |
| 5,264,856 A | * | 11/1993 | Thurlow | 342/65 |
| 5,315,363 A | * | 5/1994 | Nettleton et al. | 356/5.03 |
| 5,351,032 A | * | 9/1994 | Latorre et al. | 340/983 |
| 5,371,581 A | * | 12/1994 | Wangler et al. | 356/5.01 |
| 5,386,285 A | * | 1/1995 | Asayama | 180/169 |
| 5,465,142 A | * | 11/1995 | Krumes et al. | 356/5.01 |
| 5,638,282 A | | 6/1997 | Chazelle et al. | |

(Continued)

*Primary Examiner* — Bernarr Gregory
(74) *Attorney, Agent, or Firm* — Donna P. Suchy; Daniel M. Barbieri

(57) ABSTRACT

An exemplary embodiment relates to an aircraft system for detecting wires. The system includes a processor configured to actively sense a presence of a first object and a second object. The processor determines a location of the first object and the second object. The processor determines a potential location of a wire between the first object and the second object. The processor actively senses the wire by providing electromagnetic energy to the potential location.

23 Claims, 7 Drawing Sheets

(56) References Cited

U.S. PATENT DOCUMENTS

| | | | |
|---|---|---|---|
| 5,945,926 A | 8/1999 | Ammar et al. | |
| 6,092,009 A * | 7/2000 | Glover | 701/14 |
| 6,138,060 A * | 10/2000 | Conner et al. | 701/9 |
| 6,208,270 B1 * | 3/2001 | Dunn | 342/29 |
| 6,243,482 B1 * | 6/2001 | Eibert et al. | 342/65 |
| 6,278,409 B1 * | 8/2001 | Zuta | 342/29 |
| 6,317,202 B1 * | 11/2001 | Hosokawa et al. | 180/167 |
| 6,999,023 B2 * | 2/2006 | Block | 701/4 |
| 7,019,682 B1 * | 3/2006 | Louberg et al. | 342/175 |
| 7,120,540 B2 * | 10/2006 | Meunier | 701/301 |
| 7,146,846 B2 * | 12/2006 | Mahaffey et al. | 73/12.09 |
| 7,286,912 B2 * | 10/2007 | Rubin et al. | 701/301 |
| 7,337,043 B2 * | 2/2008 | Bull | 342/29 |
| 7,479,920 B2 * | 1/2009 | Niv | 342/65 |
| 7,543,780 B1 * | 6/2009 | Marshall et al. | 701/3 |
| 7,839,321 B2 * | 11/2010 | Huang et al. | 342/29 |
| 7,948,429 B2 * | 5/2011 | Drake et al. | 342/26 R |
| 8,010,288 B2 * | 8/2011 | Bouchet et al. | 342/29 |
| 2004/0178943 A1 * | 9/2004 | Niv | 342/29 |

* cited by examiner

SYSTEM AND METHOD FOR ACTIVELY DETERMINING OBSTACLES

BACKGROUND

The present disclosure relates generally to the field of obstacle detection. The present disclosure relates more specifically to the field of wire detection using radars or other active sensing systems.

Obstacles, such as wires that are strung between multiple vertical tower structures, may pose a threat to the aircraft. The threat posed by certain obstacles, such as wires, can be more for low altitude aircraft (e.g., such as helicopters) and in low light conditions. Heretofore, terrain avoidance systems or terrain awareness and warning systems (TAWS) have utilized databases and position detection systems to provide warnings related to obstacles such as towers. The use of databases can be problematic because they must be updated when new obstacles are built and old obstacles are removed. In addition, radar systems have been proposed that perform a direct scan for the presence of obstacles. However, sensing particular obstacles, such as wires, using a radar beam can be difficult. The small radar reflective cross sectional area of the wire at most viewing angles makes detection of the wires difficult. In addition, actively detecting wires can be prone to false alarms or warnings.

Thus, there is a need for an improved system or method for scanning for wires using a radar or other active detection system. There is also a need for a terrain avoidance system that can more accurately identify the presence of wires. Further still, there is a need for a radar system that can more accurately determine the presence of obstacles such as wires. Further still, there is a need to reduce the threat associated with obstacles having a small radar reflective cross section, such as wires.

SUMMARY

An exemplary embodiment relates to an aircraft system for detecting wires. The system includes a processor configured to actively sense a presence of a first object and a second object. The processor determines a location of the first object and the second object. The processor determines a potential location of a wire between the first object and the second object. The processor actively senses the wire by providing electromagnetic energy to the potential location.

According to an alternative embodiment, the position of an object could be determined with either a navigation/database combination or other sensor system.

Another exemplary embodiment relates to a method for sensing wires in an environment of an aircraft. The method includes determining at least a first tower or obstacle and a second tower or obstacle. The method also includes determining a potential location of a wire between the first and second towers or obstacles using electromagnetic energy.

Yet another exemplary embodiment relates to an apparatus for detecting wires. The apparatus comprises a means for processing radar data to determine a location of a first object and a second object. The means for processing determines a potential location of a wire between the first object and the second object. The apparatus also includes a means for providing a radar beam to the potential location.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, a system and method for wire detection using a radar in an aircraft (e.g., in a helicopter, other small aircraft, an airplane, or otherwise) is shown, according to an exemplary embodiment. One or more vertical tower structures (or other obstacles) may be detected by a radar system for an aircraft, and a potential location for wires running between the towers (or other obstacles) may be determined by the radar system or other system of the aircraft. The radar system may scan for the wires based on the determined potential location for the wires (e.g., a targeted detection of wires by the radar system) and the radar system may then be used to verify the existence of wires (or other similar obstacles) in the potential location.

Figure 1A:
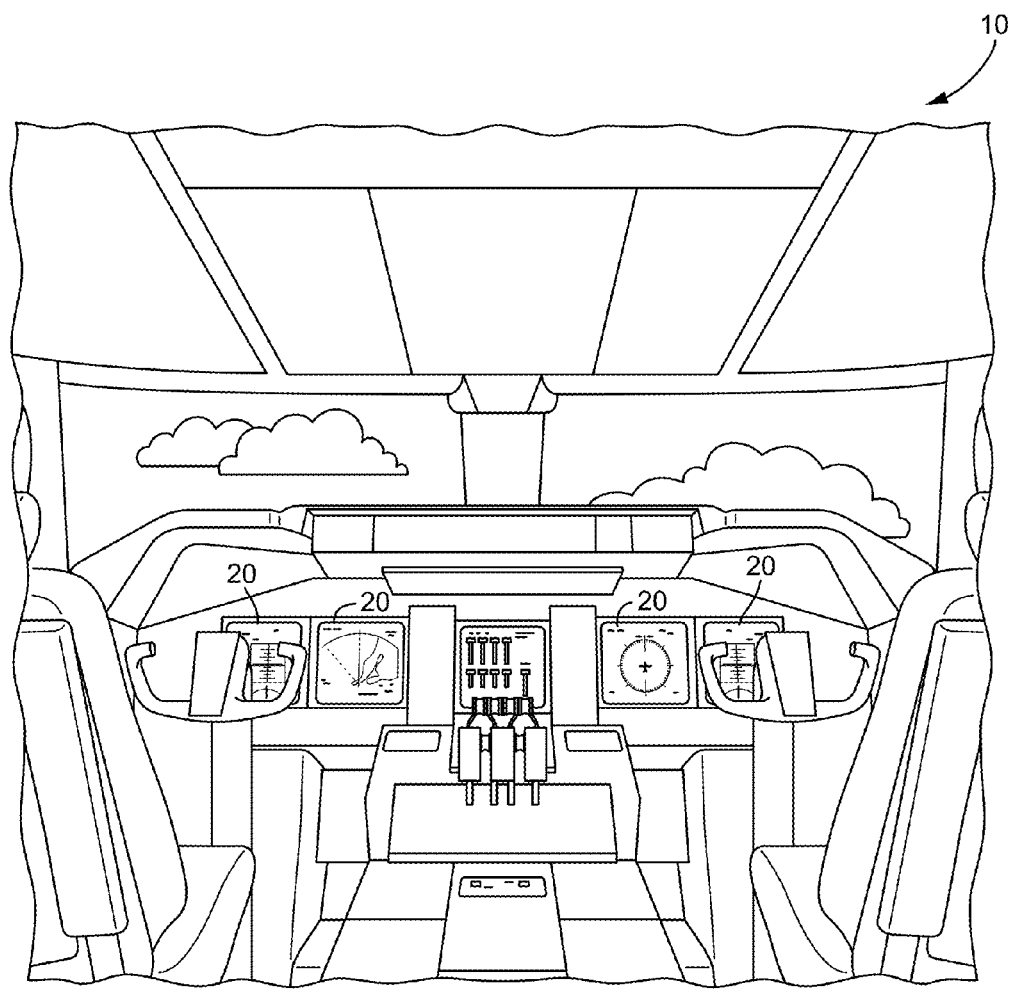
FIG. 1A is an illustration of an aircraft control center of an aircraft, according to an exemplary embodiment.

Referring to FIG. 1A, an illustration of an aircraft control center or cockpit 10 of an aircraft is shown, according to an exemplary embodiment. Aircraft control center 10 includes flight displays 20 which are generally used to increase visual range and to enhance decision-making abilities. Although shown as a fixed wing cockpit 10, cockpit 10 can be configured for use in a helicopter. In an exemplary embodiment, flight displays 20 may provide an output from a radar system (e.g., a display illustrating the location of wires as detected by the radar system) of the aircraft (e.g., fixed wing aircraft or helicopter). For example, flight displays 20 may provide a top-down view, a horizontal view, or any other view of weather, objects, and/or terrain detected by the radar system of the aircraft. Aircraft control center 10 may further include terrain awareness and warning system (TAWS) user interface elements (flashing lights, displays, display elements on a weather radar display, display elements on a terrain display, audio alerting devices, etc.) configured to warn the pilot of the aircraft of potentially threatening features (e.g., a tower or towers and wire running between the towers). The TAWS may be configured to give specific directions when a terrain or object (e.g., wires or towers) are detected. The present invention can be incorporated into various equipment in cockpit 10 including the flight management computer, TAWS, weather radar or other system. The present invention is not limited to the equipment within which the wire detection is provided. The wire detection may be performed using data and calculations of various avionic subsystems.

Figure 1B:
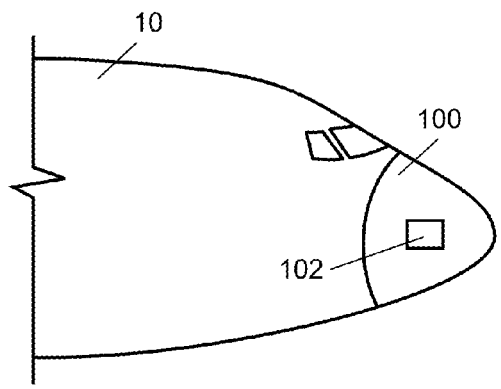
FIG. 1B is an illustration view of the nose of the aircraft of FIG. 1A, including a radar system, according to an exemplary embodiment.

Referring to FIG. 1B, the front of an aircraft is shown with aircraft control center 10 and nose 100, according to an exemplary embodiment. A radar system 102 (e.g., a weather radar system or other radar system) is generally located within nose 100 of the aircraft or within aircraft control center 10 of the aircraft. According to various exemplary embodiments, radar system 102 may be located on the top of the aircraft or on the tail of the aircraft instead. Radar system 102 may include or be coupled to an antenna system for scanning for weather, terrain, obstacles, towers, wires, or other objects. Alternatively, system 102 can be another type of active sensing system, such as a laser sensor, etc.

Figure 2A:
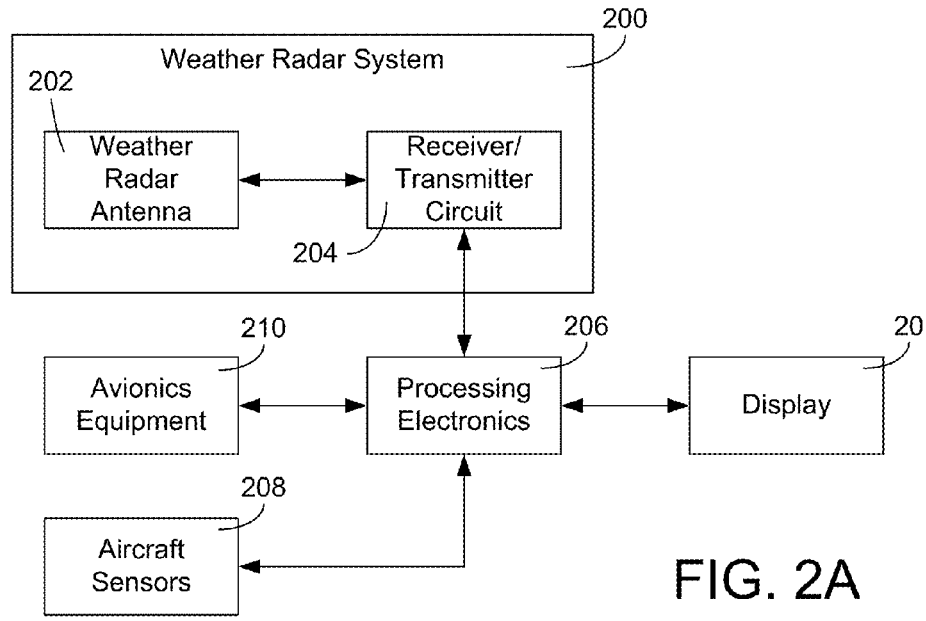
FIG. 2A is a general block diagram of a radar system for use with the systems and methods of the present disclosure, according to an exemplary embodiment.

Referring to FIG. 2A, a block diagram of a weather radar system 200 is shown, according to an exemplary embodiment. Weather radar system 200 is shown to include a weather radar antenna 202 connected (directly or indirectly) to an antenna controller and receiver/transmitter circuit 204. Receiver/transmitter circuit 204 may include any number of mechanical or electrical circuitry components or modules for steering a radar beam. Circuit 204 may be configured to conduct signal generation that results in a radar beam being provided from weather radar antenna 202 and to conduct the reception of returns received at weather radar antenna 202. Although weather radar system 200 is shown in the embodiment of FIG. 2A, according to other exemplary embodiments, the present invention can be incorporated in other radar and active detecting systems (e.g., an obstacle detecting radar or other radar) may be used. For example, the active detecting system can use light or other electromagnetic energy not associated with system 200 to detect obstacles, including towers and wires.

Radar return data is provided from circuit 204 to processing electronics 206 for processing. Processing electronics 206 may then be configured to interpret the radar return data (or other electromagnetic return data) for display on display 20 (or another display or output in the aircraft). For example, processing electronics 206 may receive radar return data regarding detected towers and wires and may provide an input to display 20 for displaying wire and tower locations to a pilot. Towers can be identified by analyzing the radar reflective cross sectional area of the object. Alternatively, other radar signature features of towers can be utilized to distinguish towers from other objects.

Processing electronics 206 may further be configured to provide control signals or control logic to circuit 204 (e.g., processing electronics 206 may generally include processing logic for operating weather radar system 200 such as configuring circuit 204 to change behavior or radar beam patterns). Processing electronics 206 is shown connected (directly or indirectly) to aircraft sensors 208 which may generally include any number of sensors configured to provide data to processing electronics 206.

Aircraft sensors 208 may include temperature sensors, humidity sensors, laser sensors, infrared sensors, altitude sensors, a global positioning system (GPS) or any other aircraft-mounted sensors that may be used to provide data (e.g., data regarding detected towers or wires) to processing electronics 206. Processing electronics 206 is further shown connected to avionics equipment 210. Avionics equipment 210 may be or include a flight management system, a navigation system, a backup navigation system, or another aircraft system configured to provide inputs to processing electronics 206. Processing electronics 206 may generally use sensors 208 and avionics equipment 210 to help determine tower or wire locations (e.g., altitude sensors may help detect if wires hanging from towers may be an obstacle, the navigation system may help determine a route around wires or towers, etc.). In an alternative embodiment, processing electronics 206 can be part of a radar based TAWS. In another alternative embodiment, weather radar system 200 may include processing electronics 206.

Figure 2B:
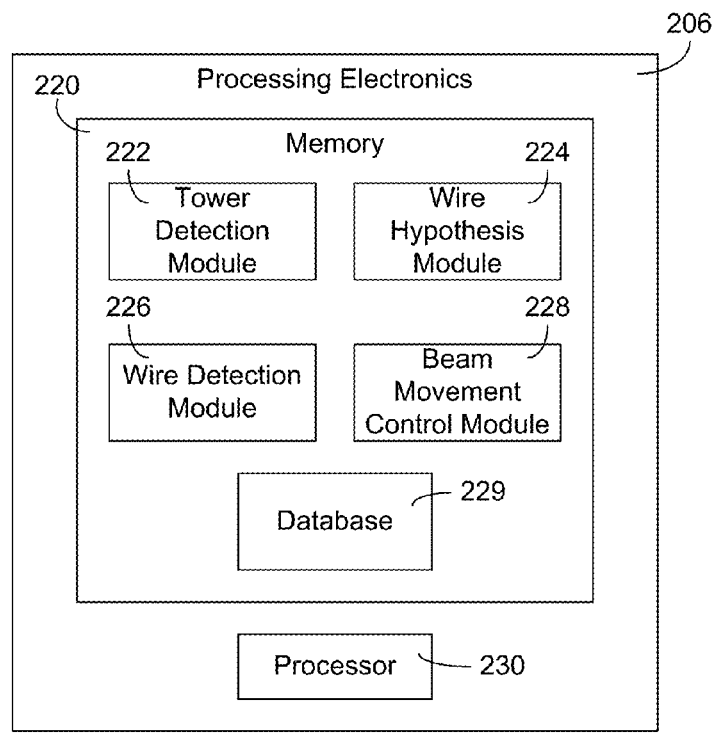
FIG. 2B is a general block diagram of the processing electronics of the radar system of FIG. 2A, according to an exemplary embodiment.

Referring now to FIG. 2B, processing electronics 206 is shown in greater detail. Processing electronics 206 includes a memory 220 and a processor 230. Processor 230 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 230 is configured to execute computer code stored in memory 220 to complete and facilitate the activities described herein. Memory 220 can be any volatile or non-volatile memory device capable of storing data or computer code relating to the activities described herein. For example, memory 220 is shown to include modules 222-228 which are computer code modules (e.g., executable code, object code, source code, script code, machine code, etc.) configured for executing by processor 230. When executed by processor 230, processing electronics 206 is configured to complete the activities described herein. Processing electronics 206 includes hardware circuitry for supporting the execution of the computer code of modules 222-228. For example, processing electronics 206 may include interfaces (e.g., an output) for communicating control signals to circuit 204 and interfaces (e.g., an input) for receiving, for example, radar return data or feedback signals from circuit 204 or other data or signals from other systems and devices.

Memory 220 is shown to include tower detection module 222. Tower detection module 222 may generally use the radar return data provided by circuit 204 to determine the presence of towers in a scanned area. Tower detection module 222 may further determine tower properties (tower location, tower height, etc.). Tower detection module 222 may additionally or alternatively receive data from a database, a navigation system, any sensor system, or otherwise for determining the existence and position of a tower. For example, tower detection module 222 may use a database to determine the existence and location of a tower or other obstacle without the use of any active sensing system for detecting towers and obstacles.

Memory 224 further includes wire hypothesis module 224. Wire hypothesis module 224 may receive tower location information from tower detection module 222 and use the tower location information to determine a potential location of wires that may run between two or more of the towers. Wire hypothesis module 224 may provide circuit 204 with potential locations for wire to scan for. Wire hypothesis module 224 may further receive data from database 229 regarding known wire location information, known tower location information, and other data for determining a potential location for wire.

Memory 220 further includes wire detection module 226. Wire detection module 226 may generally use radar return data provided by circuit 204 to determine the presence of wire. Wire detection module 226 may additionally use database 229 to verify the presence of wire in a scanned area. For example, database 229 may provide known wire location information, known tower location information, or other data for verifying a wire detection by the radar system. Memory 220 further includes beam movement control module 228. Beam movement control module 228 may be generally configured to provide circuit 204 with one or more analog or digital control signals for commanding circuit 204 to sweep a radar beam. The control signals may be an instruction to move the antenna mechanically, an instruction to conduct an electronic beam sweep in a certain way, an instruction to move the radar beam by a fixed amount (e.g., five degrees, ten degrees, etc.)., etc. Beam movement control module 228 may receive data from wire hypothesis module 224 for determining how to configure the radar beam for sweeping.

The radar beam is preferably a pencil beam or an antenna with either a vertical monopulse or sequential lobing capability. The antenna beam system is preferably sufficient to estimate tower height and to separate wires from ground clutter in range/elevation space.

Figure 3:
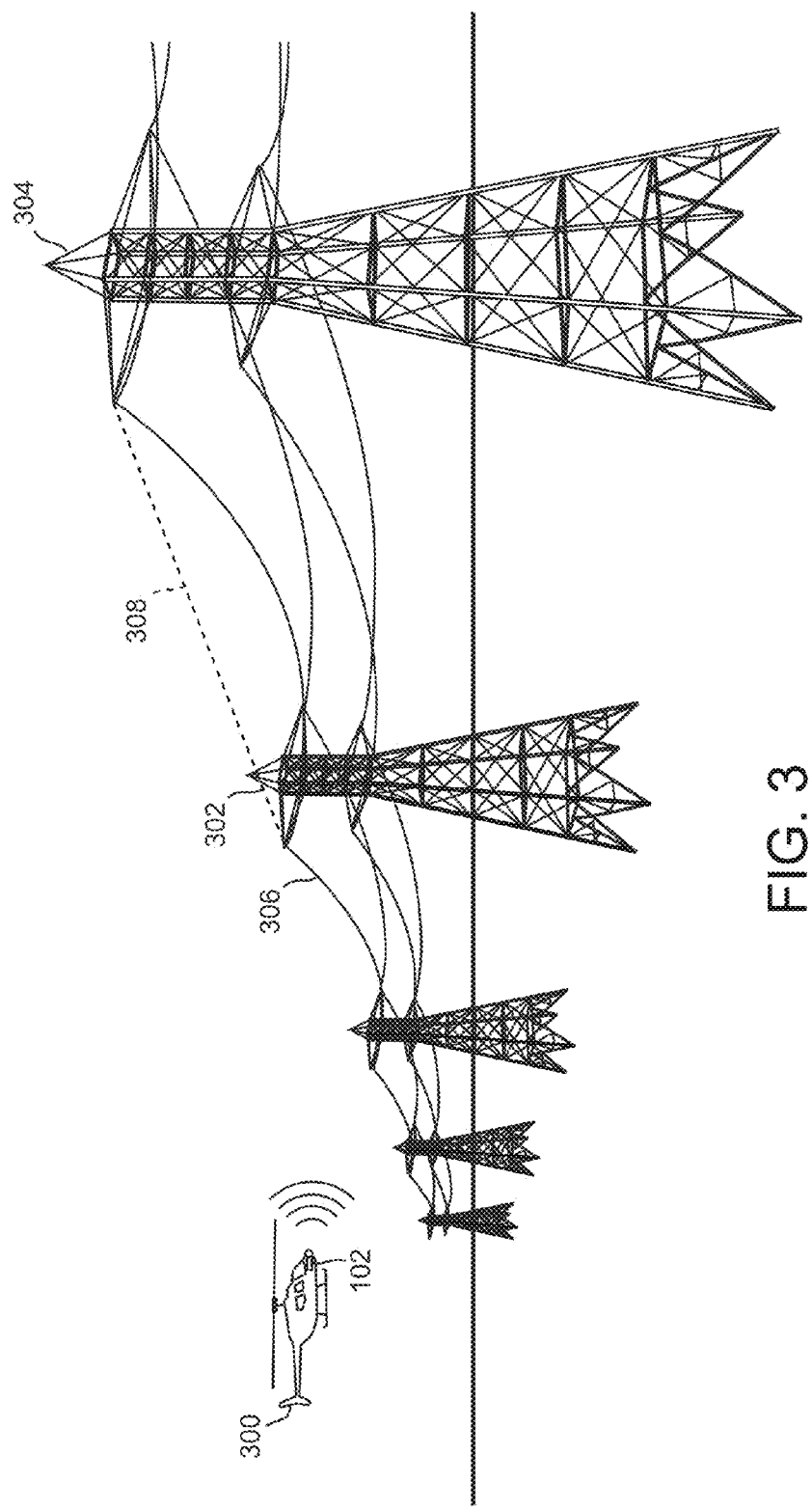
FIG. 3 is a environmental view of the aircraft of FIGS. 1A-2B detecting wires, according to an exemplary embodiment.

Referring to FIG. 3, aircraft 300 (e.g., a helicopter, small airplane, or other aircraft) is shown with weather radar system 102. Alternatively, system 102 can be another radar system, (e.g., frequency modulated continuous wave radar (FMCW)). Weather radar system 102 or other active sensing system may be configured to detect the presence of towers 302, 304 (or other obstacles to which wires are attached to) and wires 306. Weather radar system 102 may detect the presence of towers 302, 304 and provide radar return data to the processing electronics of aircraft 300. Weather radar system 102 may then scan for wires based on data received from processing electronics 206.

Figure 4A:
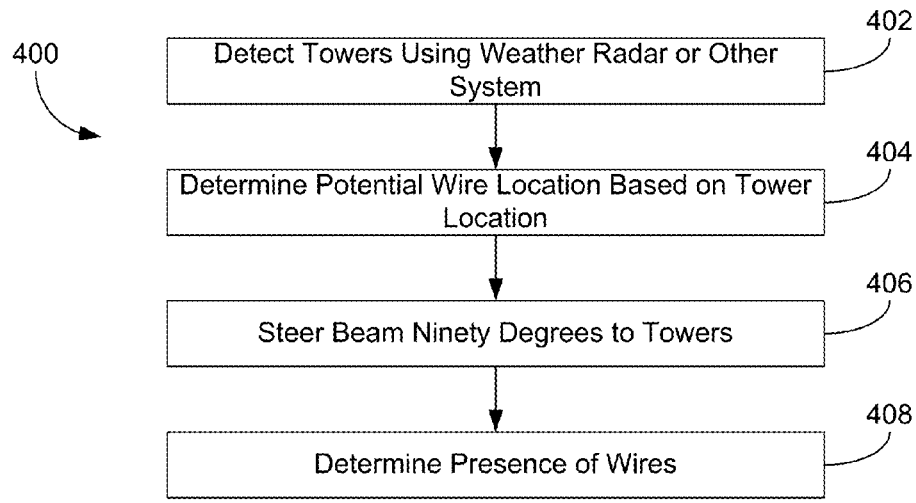
FIG. 4A is a flow chart of a wire detection process for the aircraft illustrated in FIG. 3, according to an exemplary embodiment.

Referring also to FIG. 4A, a flow chart of a process 400 for weather radar system 102 detecting wires is shown, according to an exemplary embodiment. Process 400 includes detecting towers 302, 304 using weather radar system 102 and tower detection module 222 (step 402). Alternatively, other active sensing techniques can be utilized to sense the location and height of towers 302, 304, 306 and any associated wires. Processing electronics 206 can be utilized within or outside of radar system 102 with various types of active sensors such as lasers, infrared sensors, radar sensors, etc. For example, processes 400, 420, and 520 can be performed by a processor in a TAWS and utilize data from a non-radar based active sensor without departing from the scope of the invention. Using tower information (e.g., detected tower location and detected height) for the detected towers, wire hypothesis module 224 coupled to radar system 102 may determine a potential location for wires (step 404). Towers 302 and 304 are easier to detect without false alarms than wires due to their larger size. Step 404 may include hypothesizing a location of a wire end point (e.g., a wire end point suspended to a tower 302 or 304).

Towers 302, 304 can be detected using a monopulse, vertical scan, etc. Towers 302, 304 may be initially detected by sweeping a radar beam horizontally across and above the terrain. Targets, such as towers 302, 304, that extend from the ground into the beam are detected during the horizontal sweep. The initial detection can be confirmed by additional horizontal sweeps at higher elevations or by a vertical sweep of the antenna at the proposed tower location. The height of the tower may be estimated by the fall off of return power as the beam sweeps above the tower in the horizontal scanning processes, during the vertical scanning processes, or by a lobing process (e.g., sequential lobing or its related monopulse process). Since towers 302, 304 are possible suspension points for wires, towers detected that are lower in altitude than the aircraft flight path may not be considered, and towers 302, 304 with an estimated height that extends into the aircraft flight path may be considered as possible suspension points for wires. Further, other obstacles, such as buildings, installations requiring power, or other infrastructure that can be attached to wires can also be sensed.

Radar system 102 may steer the beam of the antenna (using beam control module 228) of radar system 102 to ninety degrees and scan using the antenna (step 406). The location at which the antenna may scan may not necessarily be on the flight path of the aircraft, according to an exemplary embodiment. For example, an optimum angle to the potential location of the wire may be determined and the beam (or active sensor) may be steered to the optimum angle. Using the radar return data from the antenna, a determination of the presence of wires is made (step 408) using wire detection module 226.

A presence of wires can be confirmed if a radar target is present at the range of the line between towers 302 and wires 304. Generally, a reflection from the wires can be checked against wire reflection characteristics such as those discussed with reference to FIGS. 6A-B. The length of a reflection from the wires is similar to the reflection of a point target. The angle extent where reflections are produces is dominated by the beam width of the radar. The maximum reflection from the wire exists when the radar is pointed directly at the wire above or below the wire plane and the antenna is pointed directly at the wire where the beam is normal to the long axis of the wire. The vertical height of the point of beam/wire interception is lower in altitude than a straight line formed by the hypothesized wire end points. The wire reflections may be separated from ground clutter since a wire that extends into the aircraft flight path will be higher than ground at the same range and thus can be separated from ground in range/elevation space. If towers 302, 304 are well below the flight path, the determination of the presence of the wires is clouding the scanning operations.

A warning (audible or visual) can be made to the pilot. The warning can be color coded based upon the distance from aircraft 300. For example, a green warning may be provided if the aircraft's flight path is well above the wire, and an orange warning if the flight path is within a threshold, such as a hundred feet, and a red warning if the flight path is close to or below the wire. In addition, pilot directions for avoiding the wire can be provided.

Figure 4B:
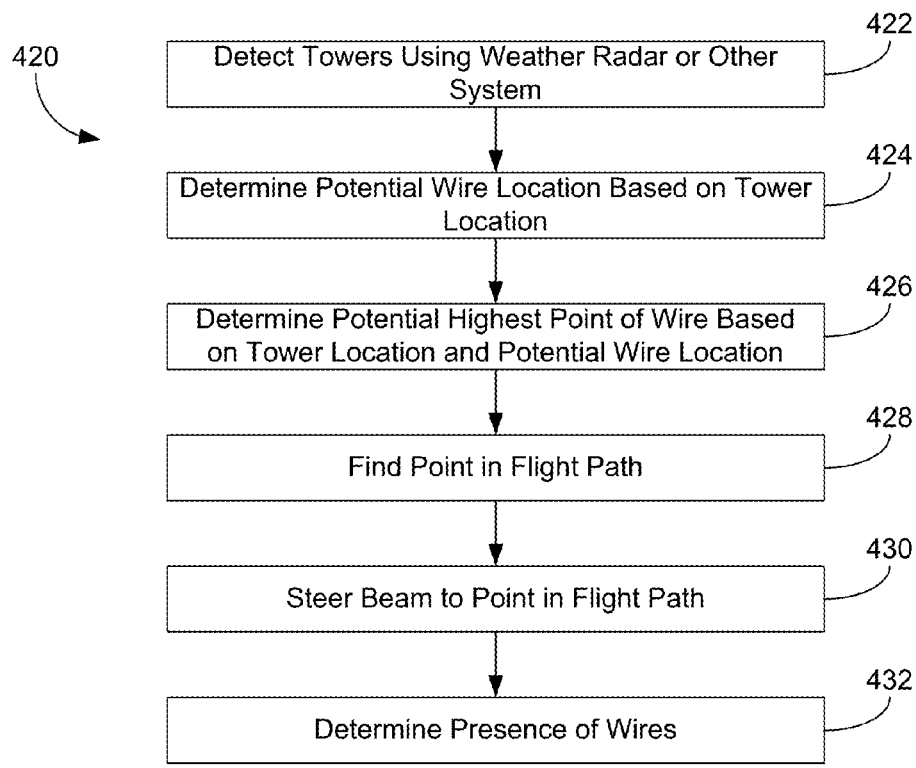
FIG. 4B is a flow chart of a wire detection process for the aircraft illustrated in FIG. 3, according to another exemplary embodiment.

Referring now to FIG. 4B, a flow chart of a process 420 for weather radar system 102 or other system detecting wires is shown, according to another exemplary embodiment. Process 420 includes detecting towers 302, 304 using weather radar system 102 or other active detecting system and tower detection module 222 (step 422) and using wire hypothesis module 224 to determine a potential location for wires based on the tower locations (step 424). Based on tower location and the potential wire location, a potential highest point for the wire (e.g., an upper limit or bound on the wire position and location) may be determined (step 426). The highest point may be generally representative of a minimum threshold for the altitude of aircraft 300 (e.g., flying at a point higher than the determined highest point of the wire). Referring also to FIG. 3, point 308 is shown as a potential highest point that may be determined based on tower properties.

The flight path and/or flight plan of aircraft 300 may be determined or retrieved (e.g., from a flight management system or other navigation system) and a point in the flight path of aircraft 300 may be found (step 428). Step 428 may generally include finding a location in the flight path that aircraft 300 may soon fly over that may coincide with a tower location or potential wire location. Radar system 102 may then steer the beam (via beam control module 228) to the point in the flight path (step 430) to search for wires at the location (e.g. a targeted detection of the wires). Using the radar return data from antenna 202, a determination of the presence of wires may be made (step 432) by wire detection module 226.

Figure 4C:
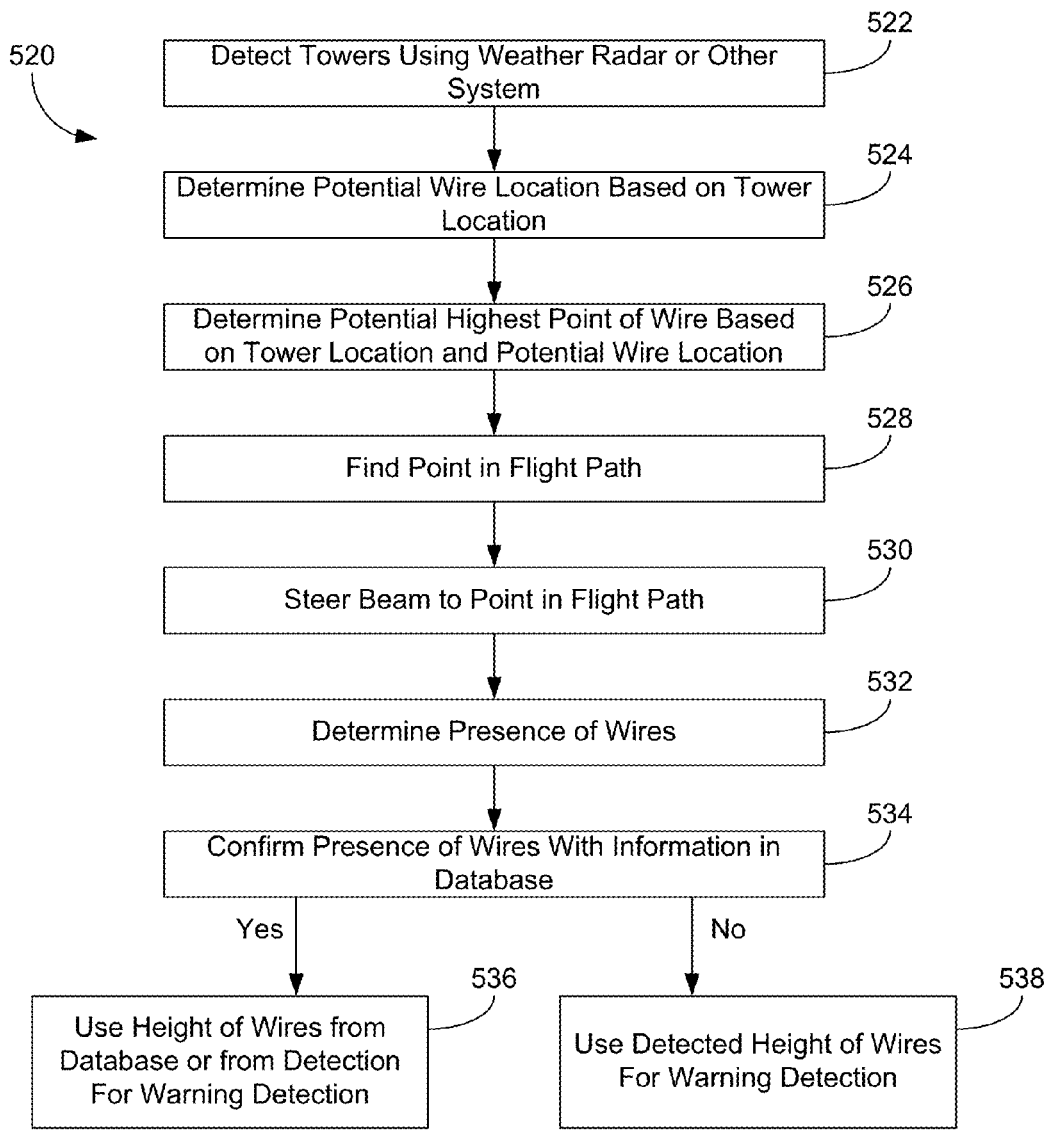
FIG. 4C is a flow chart of a wire detection process for the aircraft illustrated in FIG. 3 according to yet another exemplary embodiment.

Referring now to FIG. 4C, a flow chart of a process 520 for weather radar system 102 or other system for detecting wires is shown according to yet another exemplary embodiment. Process 520 includes detecting towers 302, 304 using weather radar system 102 or other active detecting system. Tower detection module 222 (step 522) can be utilized to determine a potential wire location based upon tower location (step 524). Towers 302 and 304 can also be detected by determining their presence in database 229. In one exemplary embodiment, towers detected by radar system 102 or other active detecting system can be compared to a database of stored information, including location about towers 302 and 304. That information can be utilized to confirm the existence of towers 302 and 304. If towers 302 and 304 match the corresponding database, information from the corresponding database can be utilized in calculations for the determination of the presence of wires. For example, information about exact tower height and exact tower location can be taken from the database. If the location or height of towers 302 and 304 do not match in the database, additional margin regarding tower location and tower height can be provided. For example, additional height for the tower can be assumed and additional height range can be provided above the detected height range.

Based upon tower location and potential wire location, a potential highest point for the wire (e.g., an upper limit or bound on the wire position and location, with or without an additional buffer) may be determined (step 526). The highest point may generally be representative of the minimal threshold for the altitude of aircraft 300. According to other exemplary embodiments, the highest point may be based on a high point regarding one or more of the towers, or other obstacle or wire properties. The flight path of aircraft 300 may be determined or retrieved (e.g., from a flight management system or other navigation system) and a point in the direction of flight or along the flight path of aircraft 300 may be found (step 528). Step 528 may generally include finding a location in the flight path that aircraft 300 may soon fly over that may coincide with a tower location or a potential wire location. Radar system 102 or other active detection system may then steer the beam (via beam control module 228) to the point in the flight path (step 530) to search for wires at the location (e.g., a detected detection of the wires). Using the radar return data from antenna 202, a determination of the presence of wires may be made at a step (step 532) by wire detection module 226.

At a step 534, processor 230 can determine the presence of wires by using information in database 229. If the presence of wires is confirmed, processor 230 can utilize the actual detected height and location of the wires or the height of wires from database 229 for a warning calculation (at a step 536). In a preferred embodiment, processor 230 utilizes the highest height of wires in database 229 or from the actual detection. If the presence of wires cannot be confirmed in database 229, processor 230 can use the detected height of wires for warning detection (step 538). As the height of wires cannot be confirmed in a database, additional margin or buffer may be provided in the warning detection calculation by providing an additional buffer for the detected height of the wires.

Referring generally to FIGS. 4A-C, processes 400, 420, 520 are shown to detect towers; however, according to various exemplary embodiments, other obstacles to which wire may be suspended from may be detected. For example, wires may be suspended from a building to a tower, from a terrain feature (e.g., a bluff) to a tower, or another obstacle. Processes 400, 420, 520 may include detecting the obstacles other than towers and hypothesizing a wire end point based on the obstacle position.

Figure 5:
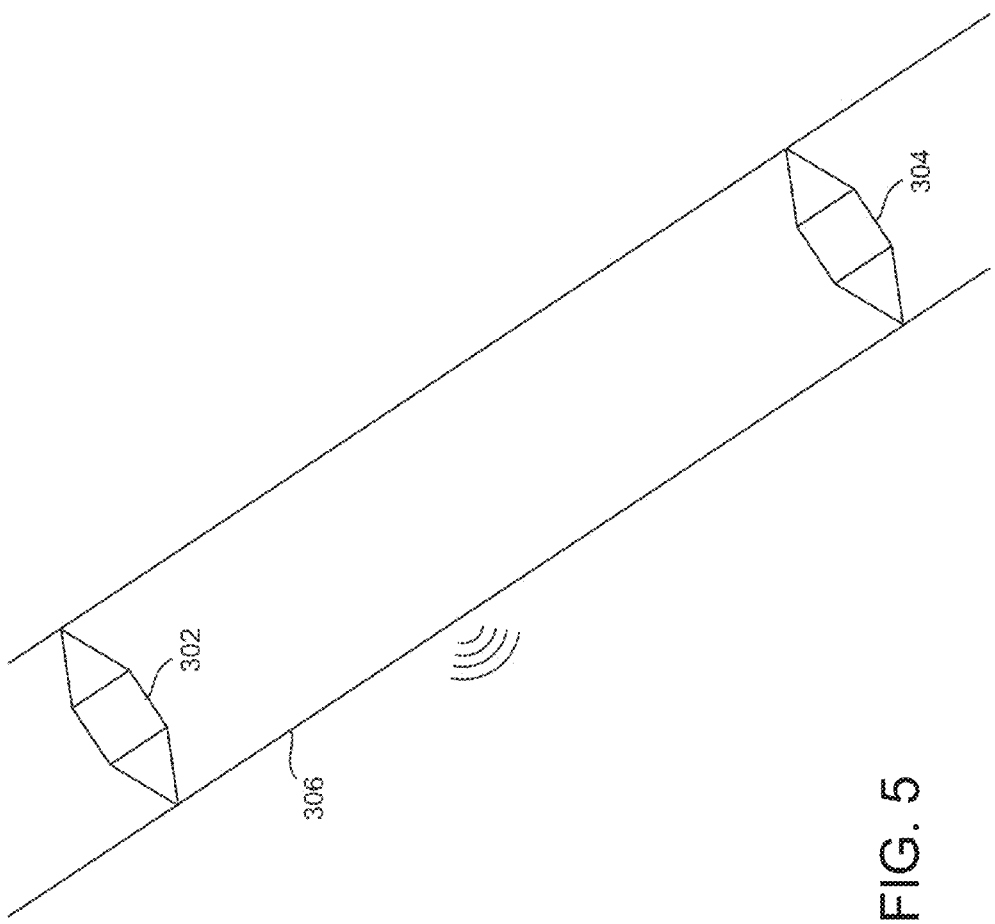
FIG. 5 is an illustration of an aircraft detecting wires at an angle, according to an exemplary embodiment.
Figure 5:
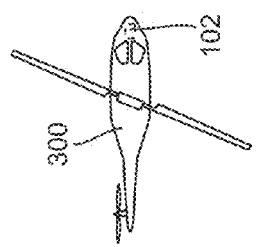

Referring also to FIG. 5, aircraft 300 is shown at an angle to towers 302, 304 and wires 306. According to an exemplary embodiment, wires may be detected even when wires 306 may not be in the direct flight path or may not be directly in front of aircraft 300. As one example, the radar system of aircraft 300 may scan at an angle (e.g., an incidence angle between aircraft 300 and wires 306) and may determine the presence of wires 306, whether or not the location to be scanned is in the flight path of aircraft 300. The angle may be an optimal angle at which the detection of wires 306 may be easiest (e.g., at an angle normal to the wire's long dimension). In one embodiment, the angle is between 60 and 120 degrees (e.g., preferably ninety degrees or normal to the long axis of the wire) with respect to the line between towers 302 and 304. In certain embodiments, the location where the radar is aimed may not necessarily be the flight path of the aircraft. Instead, detection that substantiates the wire existence will be located at the normal angle to the proposed wire's long dimension.

Figures 6A, 6B:
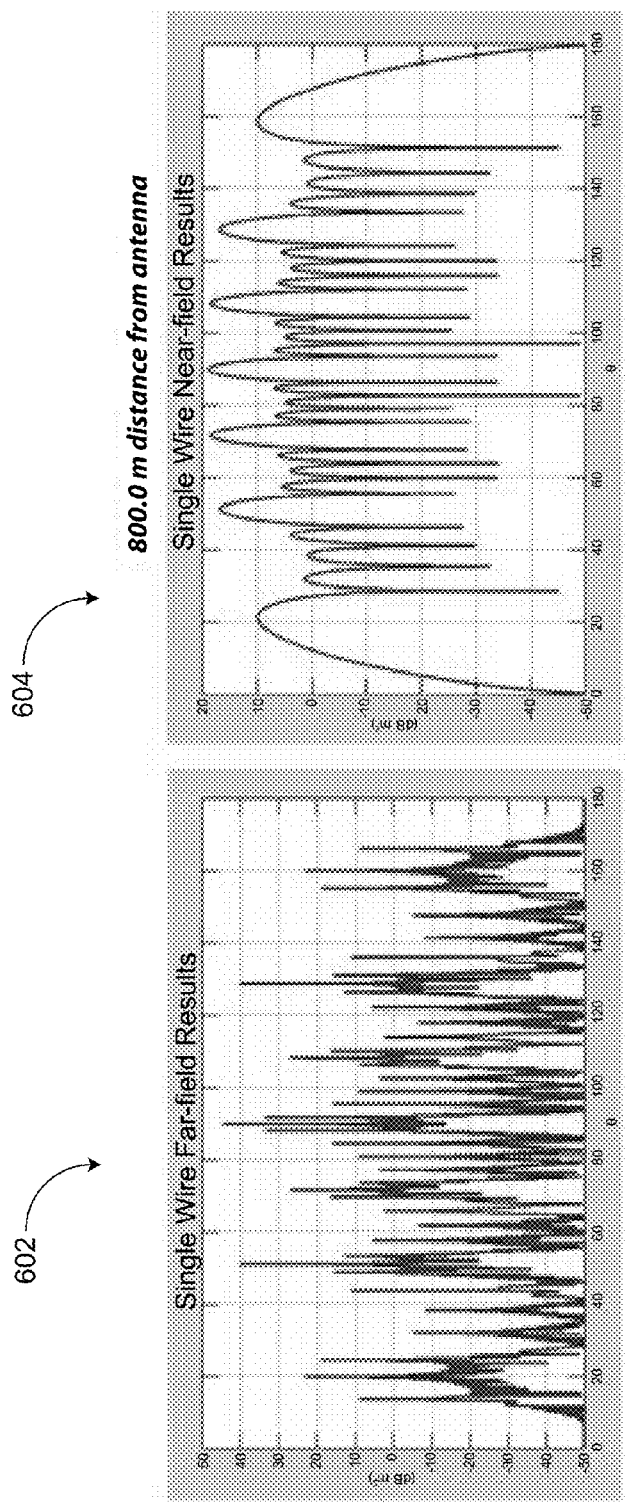
FIG. 6A is a graph showing far field reflectivity of a wire.
FIG. 6B is a graph showing near field reflectively of a wire.

With reference to FIGS. 6A-B, reflectivity responses 602 and 604 are shown. Response 604 is for near field imaging at a range of 800 M of a single wire at a height of 42.5 ft above the ground, having a 130 ft span and a dip of 0.92 ft. Response 602 is for far field imaging at a range of 800 M of a single wire at a height of 42.5 ft above the ground, having a 130 ft span and a dip of 0.92 ft. Far field imaging is at ranges greater than $(2*D^2)/\lambda$ where $\lambda$ is the wavelength of the beam and D is the distance of the wire.

The X axis in FIGS. 6A-B is the angle of incidence and the Y-axis in FIGS. 6A-B is the magnitude referenced to dB square meter. The reflection is greatest at 90 degrees. In addition, other maximums could be sensed to authenticate the presence of wires. With reference to FIG. 6B, other maximums could be determined at approximate angles of 50, 70, 110, and 130 degrees to verify the presence of a wire in a near field imaging embodiment. Alternative signature analysis methods could be utilized to determine a match to a reflection signature of a wire to response 604 or other response representative of a wire. Similarly, far field imaging embodiments could match to a signature associated with response 602 or to other responses representative of a wire. Responses 602 and 604 are shown for the purpose of discussion only. The present invention is not limited to use or comparison with responses 602 and 604.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An aircraft system for detecting a presence of an obstruction between a first object and a second object, the system comprising:
    a radar; and
    a processor configured to receive first radar data from the radar and to determine a presence of the first object and the second object from the radar data and to determine a location of the first object and the second object, the processor determining a potential location of the obstruction between the first object and the second object, the processor causing the radar to provide a radar signal to the potential location, the processor receiving second radar data associated with the radar signal to determine the presence of the obstruction.

2. The system of claim 1, further comprising:
    a database, the database including a location entry and a height entry for the first object and the second object, wherein the processor compares the location entry to the location of the first object.

3. The system of claim 1, further comprising:
    a database including height entries for the first object and the second object, wherein the processor uses the higher of the height entries for the first object and the second object or a height of the obstruction detected using the second radar data for providing a warning.

4. The system of claim 1, wherein the obstruction is a wire, and wherein the processor causes the radar signal to steer to a range of angles to maximize the reflection from the wire, the wire being suspended between the first object and the second object.

5. The system of claim 4, wherein the angle is normal to the long axis of the wire.

6. The system of claim 1, wherein the radar signal comprises a radar beam and the radar is a weather radar system.

7. The system of claim 1, further comprising:
    a database, the database including a location entry and a height entry for the first object and the second object, wherein the processor compares the location entry to the location of the object, and provides an additional buffer for the height entry if the location entry does not match the location.

8. The system of claim 1, wherein the radar utilizes light or radar beams.

9. The system of claim 1, wherein the processor is part of a weather radar system or terrain avoidance system.

10. The system of claim 1, wherein the processor is part of a radar-based TAWS.

11. A method for sensing obstructions in an environment of an aircraft, the method comprising:
    determining at least a first tower or object and a second tower or object; and
    determining a potential location of an obstruction between the first and second towers or objects using at least one radar signal.

12. The method of claim 11, wherein the determining step is done via a database including tower or object information.

13. The method of claim 11, wherein the radar signal is a radar beam from a weather radar system.

14. The method of claim 11, further comprising: comparing a location of a sensed object to a stored location in a database.

15. The method of claim 11, wherein the first object is a tower.

16. The method of claim 15, wherein the first object is identified as a tower by analyzing its radar reflective cross sectional area.

17. An apparatus for detecting obstructions, the apparatus comprising:
    means for processing radar data to determine a location of a first object and a second object;
    means for determining a potential location of an obstruction between the first and second object; and
    means for providing a radar beam to the potential location.

18. The apparatus of claim 17, further comprising:
    means for displaying a warning when the obstruction is detected.

19. The system of claim 18, wherein the obstruction is a wire and the radar beam is provided at an angle of 90 degrees to the longitudinal axis of the wire.

20. The system of claim 19, wherein the means for processing is part of a weather radar system or Terrain Awareness Warning System.

21. An aircraft system for detecting object, the system comprising:
- a weather radar receiver; and
- a processor configured to receive radar data from the weather radar receiver, wherein the processor analyzes a cross-sectional area of a target return in the radar data to identify the object.

22. The system of claim 21, wherein of a type of the object and a location of the object is compared to a database of objects to verify the type and the location.

23. The system of claim 22, wherein a height of the object is determined and compared to the height of the object in the database.

\* \* \* \* \*